US008556711B2

(12) United States Patent
Bernsen

(10) Patent No.: US 8,556,711 B2
(45) Date of Patent: Oct. 15, 2013

(54) PARI-MUTUEL WAGERING COMBINED WITH RANDOM-GENERATED NUMBERS FOR GENERATING JACKPOTS WITH A RANDOM DRAW

(76) Inventor: David Bernsen, San Diego, CA (US)

( * ) Notice: Subject to any disclaimer, the term of this patent is extended or adjusted under 35 U.S.C. 154(b) by 0 days.

(21) Appl. No.: 13/248,773

(22) Filed: Sep. 29, 2011

(65) Prior Publication Data

US 2013/0084968 A1 Apr. 4, 2013

(51) Int. Cl.
*G06F 17/00* (2006.01)

(52) U.S. Cl.
USPC .......... 463/28

(58) Field of Classification Search
USPC .......... 463/16–25, 28–30
See application file for complete search history.

(56) References Cited

U.S. PATENT DOCUMENTS 6,017,032 A * 1/2000 Grippo et al. .......... 273/138.1
6,152,822 A 11/2000 Herbert
6,309,307 B1 10/2001 Krause et al.
7,713,125 B2 * 5/2010 Asher et al. .......... 463/28
2007/0026939 A1 * 2/2007 Asher et al. .......... 463/28
2007/0197281 A1 * 8/2007 Stronach .......... 463/28
2011/0275425 A1 * 11/2011 Asher et al. .......... 463/6

* cited by examiner

*Primary Examiner* — Ronald Laneau
(74) *Attorney, Agent, or Firm* — Beck & Tysver PLLC

(57) ABSTRACT

A method for wagering may include accepting bets for wagered sums from a plurality of bettors based on each bettor's selected expected outcome of a pari-mutuel event and assigning one or more of a predetermined quantity of randomly generated numbers to each bettor's bet. A portion of the wagered sums may be assigned to a jackpot pool. Event-winning bettors may be paid a calculated pari-mutuel sum after the event if the bettor's selected outcome occurs. A drawing may be conducted from among the predetermined quantity of randomly generated numbers. At least a portion of the jackpot may be paid to any one of the event-winning bettors if there is a match between a drawn number and one of the randomly generated numbers of the event-winning bettor; and if not, carrying over the jackpot to a subsequent event thereby increasing the value of the potential wager to the bettor.

10 Claims, 2 Drawing Sheets

PARI-MUTUEL WAGERING COMBINED WITH RANDOM-GENERATED NUMBERS FOR GENERATING JACKPOTS WITH A RANDOM DRAW

BACKGROUND OF THE INVENTION

The present invention generally relates to pari-mutuel wagering and, more particularly, to combining such wagering activities with jackpot bonus opportunities for bettors.

Pari-mutuel wagering is preferred by some bettors because it pits one bettor against other bettors and allows for a bettor to study various historical and predictive factors of the event to make an educated prediction of the outcome of the event prior to placing their wager. For example, in a horse race, a bettor may review the history of form or past performances of the horses, the strike rates of jockeys, breeding and pedigree of the horses, trainers, and other related information. Consideration of such information enables a bettor to make a more educated prediction regarding the outcome of a race or other event than other bettors placing wagers on the same event, thus giving a bettor the opportunity to create an edge or advantage over other less informed or less diligent bettors.

Many individuals prefer other types of wagering, such as video slot machines, video poker machines, purchasing of lottery tickets, pull tab tickets, or other wagering activities based on randomly generated outcomes, because they find the act of studying (aka handicapping) a pari-mutuel wager to be too complex, difficult and time consuming. Moreover, some of these non-pari-mutuel wagering activities may present "jackpot" opportunities. Some bettors consider such opportunities for jackpots to be desirable because they hold out a promise of providing a life-altering outcome for a bet.

Over the past decade there has been a dramatic increase in casino style wagering (i.e. video slot machines, video poker machines, table games, etc.) and the expansion of lotteries in many states, in which each, has put pari-mutuel wagering events such as horse racing, under a great deal of competitive pressure which has been reflected in the continual loss of market share.

As can be seen, there is a need for a system of wagering in which a bettor may employ skills associated with pari-mutuel style wagering while also being provided with life-altering jackpot opportunities in connection with a particular bet—which currently does not exist today.

SUMMARY OF THE INVENTION

In one aspect of the present invention, a method for wagering comprising the steps of: accepting bets for wagered sums from a plurality of bettors based on each bettor's selected expected outcome of a pari-mutuel event; assigning one or more of a predetermined quantity of randomly generated numbers to each bettor's bet; assigning a portion of the wagered sums to a jackpot pool; paying event-winning bettors a calculated pari-mutuel sum after the event if the bettors selected outcome occurs; conducting a random drawing from among the predetermined quantity of randomly generated numbers; paying at least a portion of the jackpot to any one of the event-winning bettors if there is a match between a drawn number and one of the randomly generated numbers of the event-winning bettor; and if not, carrying over the jackpot to a subsequent event thereby increasing the value of the potential wager to the bettor.

In another aspect of the present invention, a system for wagering may comprise: one or more wager acceptance sites configured to accept bets for wagered sums from a plurality of bettors based on each bettor's selected expected outcome of a pari-mutuel event and for paying event-winning bettors a calculated pari-mutuel sum after the event if the bettor's selected outcome occurs; and a processing computer configured to assign one or more of a predetermined quantity of randomly generated numbers to each bettor's bet, assign a portion of the wagered sums to a jackpot pool, conduct a drawing from among the predetermined quantity of randomly generated numbers so that at least a portion of the jackpot is paid to any one of the event-winning bettors if there is a match between a drawn number and one of the randomly generated numbers of the event-winning bettor; and if not, carrying over the jackpot to a subsequent event thereby increasing the value of the potential wager to the bettor.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features.

Broadly, embodiments of the present invention generally provide systems of wagering in which a bettor may employ skills associated with pari-mutuel style wagering while also being provided with jackpot opportunities in connection with a particular bet.

Figure 1:
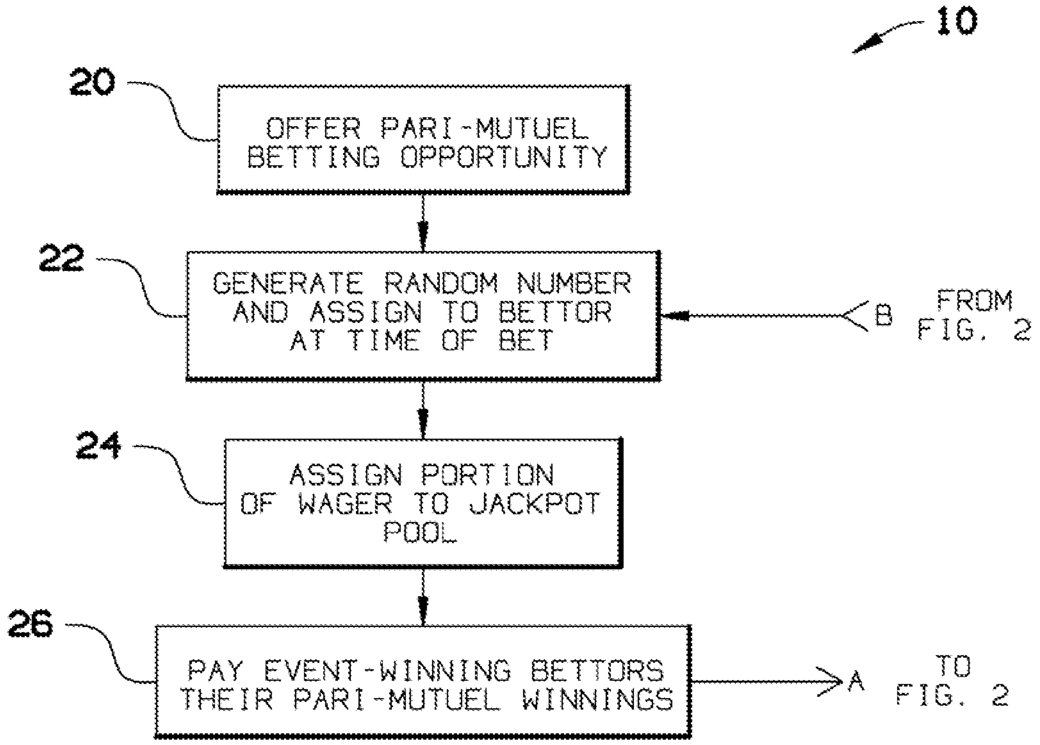
FIGS. 1 and 2 are flow charts of a method of wagering in accordance with an embodiment of the invention.
Figure 2:
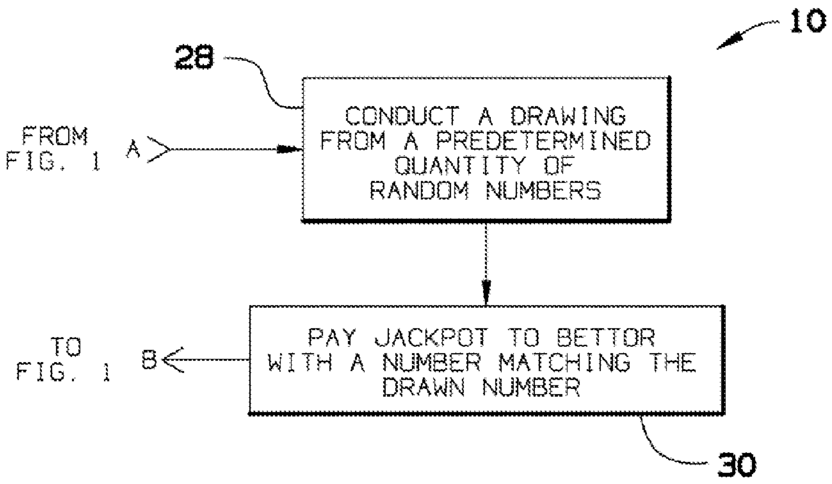

Referring now to FIGS. 1 and 2, it may be seen that an exemplary embodiment of system 10 of wagering may employ the following steps. In a step 20, a betting establishment such as a race track, a betting parlor or an internet betting site may offer pari-mutuel betting opportunities for selected events such as sporting contests or horse races. In the exemplary case of a horse race, a bettor may place a pari-mutuel wager on the race by selecting the correct order of finish of a selected number of horses in the race, such as an exacta (prediction of first and second place); trifecta (prediction of first, second and third place); superfecta (prediction of first through fourth place); a horse finishing within a specified range of positions such as a 'show' wager for a given runner to finish in either first, second or third place; or a Quinella wager (for predicting the first and second place finishers regardless of order). In a step 22, at the time the wager is placed, one or more of a predetermined quantity of randomly generated numbers may be assigned to each bettor's bet. In a step 24, a predetermined portion of all of the wagered sums for the event may be assigned to a jackpot pool.

In a step 26, after completion of the event, the betting establishment may pay event-winning bettors a conventional calculated pari-mutuel winning sum. In a step 28, a drawing may be conducted from among the predetermined quantity of randomly generated numbers. In a step 30, an event-winning bettor may be paid the jackpot if there is a match between a drawn number and the event-winning bettor's number. If there is a match between the drawn number and the number of more than one event-winning bettor, the jackpot may be divided among those bettors. If there is no match, then the jackpot amount may be rolled into a future jackpot for a subsequent event and may eventually paid when an event results in a match between a drawn number and that of an event-winning bettor.

Bettors may be able to place bets through advanced wagering deposit (AWD) accounts. Minimums units for bets may be established at any level using any recognized currency, and in low levels such as 10 c (ten cents) in United States currency. The system 10 may be implemented so that a bettor may receive one of the assigned random numbers for each 10 c unit wagered on a particular bet.

The system 10 may be particularly attractive to a bettor because, among other things, the portion of the wagered sum that is assigned to the jackpot pool may not subject to conventional takeout requirements, (e.g., distribution to horse owners and track operating expenses). Secondly, the system 10 may be operated with small minimum wagering units similar to those employed by casino operations such as video slot and poker machines. Additionally, the combination of low minimum units and potential carryover of jackpots may create life-changing jackpots equal to or greater than some lotteries.

Figure 3:
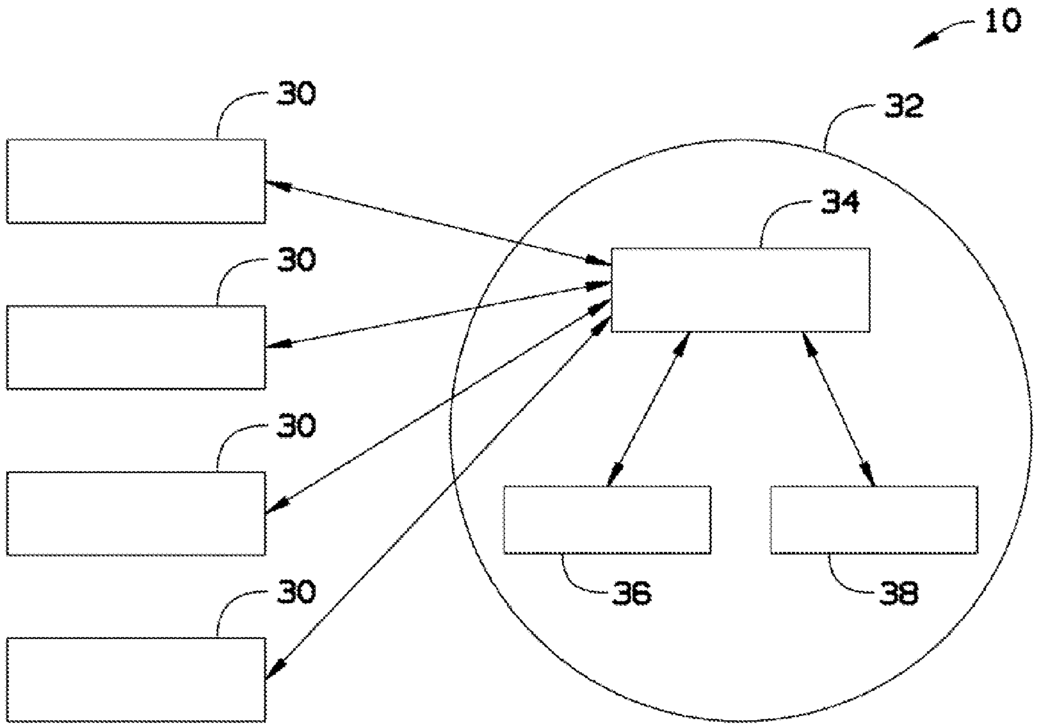
FIG. 3 is a block diagram of a system for accommodating wagering in accordance with an embodiment of the invention.

Referring now to FIG. 3, it may be seen that the system 10 may be operated with a structure that may comprise wager acceptance sites 30 which may be interconnected with a pari-mutuel processing center or computer 32. The processing center may embody a processor 34 for performing pari-mutuel calculations, a processor 36 for generating random numbers and a processor 38 for distributing event winnings and maintaining an accounting of jackpots.

It should be understood, of course, that the foregoing relates to exemplary embodiments of the invention and that modifications may be made without departing from the spirit and scope of the invention as set forth in the following claims.

What is claimed is:

1. A computerized method for wagering comprising the steps of:

accepting bets for wagered sums from a plurality of bettors based on each bettor's selected expected outcome of a pari-mutuel event;

assigning, at a processing computer, one or more of a predetermined quantity of randomly generated numbers to each bettor's bet;

assigning, at the processing computer, a portion of the wagered sums to a jackpot pool;

paying event-winning bettors a calculated pari-mutuel sum after the event if the bettor's selected outcome occurs;

conducting a drawing at the processing computer from among the predetermined quantity of randomly generated numbers;

paying at least a portion of the jackpot to any one of the event-winning bettors if there is a match between a drawn number and one of the randomly generated numbers of the event-winning bettor.

2. The method of claim 1 further comprising the step of retaining any remaining sum in the jackpot pool if no match occurs between the drawn number and an assigned number of any event-winning bettors.

3. The method of claim 1 wherein the event is a horse race.

4. The method of claim 3 wherein the expected selected outcome is an order of finish of two or more horses.

5. The method of claim 1 wherein the quantity of randomly generated numbers assigned to a bettor is determined by the amount of the bettor's wagered sum.

6. The method of claim 5 wherein a minimum bet is any amount established by the operator of the wager and a randomly generated number is assigned to the bettor for each minimum unit of the wagered sum.

7. The method of claim 1 wherein the portion of wagered sums assigned to the jackpot pool is not diminished by takeout.

8. A system for wagering comprising:

one or more wager acceptance sites configured to accept bets for wagered sums from a plurality of bettors based on each bettor's selected expected outcome of a pari-mutuel event and for paying event-winning bettors a calculated pari-mutuel sum after the event if the bettor's selected outcome occurs; and a processing computer configured to assign one or more of a predetermined quantity of randomly generated numbers to each bettor's bet, assign a portion of the wagered sums to a jackpot pool, conduct a drawing from among the predetermined quantity of randomly generated numbers so that at least a portion of the jackpot is paid to any one of the event-winning bettors if there is a match between a drawn number and one of the randomly generated numbers of the event-winning bettor.

9. The system of claim 8 wherein the processing computer is configured to assign the portion of the wagered sums to the jackpot pool without subtracting takeout from the portion.

10. The system of claim 8 wherein the wager acceptance sites are configured to accept wagers from a bettor's advanced wager deposit account.

* * * * *